(12) United States Patent
Kume et al.

(10) Patent No.: US 6,243,540 B1
(45) Date of Patent: Jun. 5, 2001

(54) LENS BARREL ASSEMBLY

(75) Inventors: Hideaki Kume, Hachioji; Kunio Yokoyama, Hino, both of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/440,966

(22) Filed: Nov. 16, 1999

(30) Foreign Application Priority Data

Nov. 24, 1998 (JP) .................................................. 10-332977

(51) Int. Cl.[7] .................................................... G03B 11/04
(52) U.S. Cl. ............................................ 396/534; 359/611
(58) Field of Search ............................. 396/534; 359/612, 359/611

(56) References Cited

U.S. PATENT DOCUMENTS

| | | | |
|---|---|---|---|
| 1,848,879 | * | 3/1932 | Halbasch ............................. 359/612 |
| 2,845,835 | * | 8/1958 | Weiss ................................... 359/612 |
| 5,294,954 | * | 3/1994 | Nomura et al. ....................... 396/534 |

* cited by examiner

*Primary Examiner*—W. B. Perkey
(74) *Attorney, Agent, or Firm*—Ostrolenk, Faber, Gerb & Soffen, LLP

(57) ABSTRACT

A lens barrel assembly includes a lens barrel and a lens hood detachably mounted on the lens barrel. A lens barrel includes a mounting threaded portion and three guide rails at three circularly equally spaced positions around the lens barrel. Each guide rail is provided with a forward latch and a rearward latch. The lens hood is constructed of an elastically deformable member, and has a notch to be engaged with the rail. The lens hood is in sliding engagement with the outer circumference of the lens barrel, and is movable between a retracted position and a photographing position. At each position, the lens hood is locked by the respective latch. The lens hood is easily shifted to the photographing position or to the retracted position along the lens barrel, and is also easily attached to and detached from a camera.

14 Claims, 5 Drawing Sheets

LENS BARREL ASSEMBLY

BACKGROUND OF THE INVENTION

1. Field of the Invention

The present invention relates a lens barrel assembly having a lens hood for blocking unwanted light, detachably mounted to a camera body or an imaging lens frame.

2. Description of the Related Art

There are available several types of structures for lens barrels with lens hoods, each detachably mounted to a camera body or an imaging lens frame.

A lens barrel assembly having a first conventional lens hood, as shown in an exploded perspective view in FIG. 7 and in sectional view in FIG. 8, includes a lens barrel 11 and an elastically deformable rubber lens hood 13. The lens barrel 11, with an imaging lens 12 received therein, includes a threaded portion 11a to be threadingly engaged with a camera body, a first outer circumference portion 11b having a flange 11d, and a second outer circumference portion 11c. The lens hood 13 includes an inner circumference portion 13a in sliding engagement with the second outer circumference 11c, and a ring portion 13b.

To attach the lens hood 13 to the lens barrel 11, the lens hood 13 is received around the lens barrel 11 and slid over the threaded portion 11a and the flange lid. Referring to FIG. 8, when the lens hood is not used, i.e., in a refracted state, the lens hood 13 recedes to a retracted position, as represented in dashed lines, abutting the flange lid. When the lens hood 13 is in use, i.e., in a photographing state, the lens hood 13 is extended to an operative position where the ring portion 13b abuts the end face of the second outer circumference 11c.

When the lens barrel 11 is attached to or detached from the camera, in the lens barrel haying the above first conventional lens hood, the threaded portion 11a needs to be turned. If the lens barrel 11 is turned with the lens hood 13 held in a hand, the lens hood 13 may inconveniently slip.

A lens barrel assembly having a second conventional lens hood, as shown in an exploded perspective view in FIG. 9 and in a partial sectional view in FIG. 10, taken along line X-X in FIG. 9, includes a lens barrel 15 and an elastically deformable synthetic resin lens hood 17. The lens barrel 15, with an imaging lens 16 received therein, includes a threaded portion 15a to be threadingly engaged with a camera body, a stopper portion 15c and a notch 15b. A lens hood 17 includes a latch 17a to be engaged with the notch portion 15b.

When the lens hood 17 is attached to the lens barrel 15, the lens hood 17 is received around the lens barrel 15 from the side of the imaging lens 16, and turned so that the latch 17a is engaged with the notch 15b, the elevated peripheral edge 15d defining the notch 15b. To place the lens hood 17 in an inoperative state, the latch 17a is disengaged from the notch 15b, and the lens hood 17 is dismounted.

To place the lens hood 17 in the inoperative state in the lens barrel having the second conventional lens hood, the lens hood 17 needs to be completely dismounted by disengaging the latch from the lens barrel 15. The lens hood 17 has to be kept separately, possibly inconveniencing the user.

A lens barrel assembly having a third conventional lens hood, shown in an exploded perspective view in FIG. 11, includes a lens barrel assembly 21 that is integral with a camera body, and a lens hood 23. An imaging lens 22 is received in the lens barrel 21. The lens hood 23 includes a threaded portion 23a which is threadingly engaged with a filter mounting thread 21a on the front portion of the lens barrel 21.

To place the lens hood 23 into an inoperative state in the lens barrel with the third conventional lens hood, the threaded portion 23a needs to be fully threadingly disengaged from the lens barrel 21.

SUMMARY OF THE INVENTION

Accordingly, it is an object of the present invention to provide a lens barrel having a lens hood, easily detached from and attached to a camera frame or a camera, in which the lens hood is easily moved between a photographing position and a retracted position.

In accordance with the present invention, a lens barrel assembly is rotated to be detachably mounted to one of a camera body and an imaging lens frame for use in combination with the one of the camera body and the imaging lens frame, and includes a lens barrel and a lens hood. The lens barrel is mounted on the lens barrel in a manner such that the lens barrel is movable in a direction corresponding to the optical axis between a photographing position, where the lens hood blocks light rays other than effective light rays during photographing, and a retracted position, where the lens hood is in a retracted, non-photographing state.

In accordance with the present invention, another lens barrel assembly is rotated to be detachably mounted to one of a camera body and an imaging lens frame for use in combination with the one of the camera body and the imaging lens frame, and includes a lens barrel and a lens hood. The lens barrel is mounted on the lens barrel in a manner such that the lens barrel is movable in a direction corresponding to the optical axis. The lens hood is guided by a guide which moves the lens hood only in the direction corresponding to the optical axis between a photographing position, where the lens hood blocks light rays other then effective light rays during photographing, and a retracted position, where the lens hood is in a retracted, non-photographing state.

These and other features and advantages of the present invention will become apparent from the following description of its preferred embodiments.

DESCRIPTION OF THE DRAWINGS

The invention is described in detail below with reference to the following figures throughout which similar reference characters denote corresponding features consistently, wherein.

DESCRIPTION OF THE PREFERRED EMBODIMENTS

Figure 1:
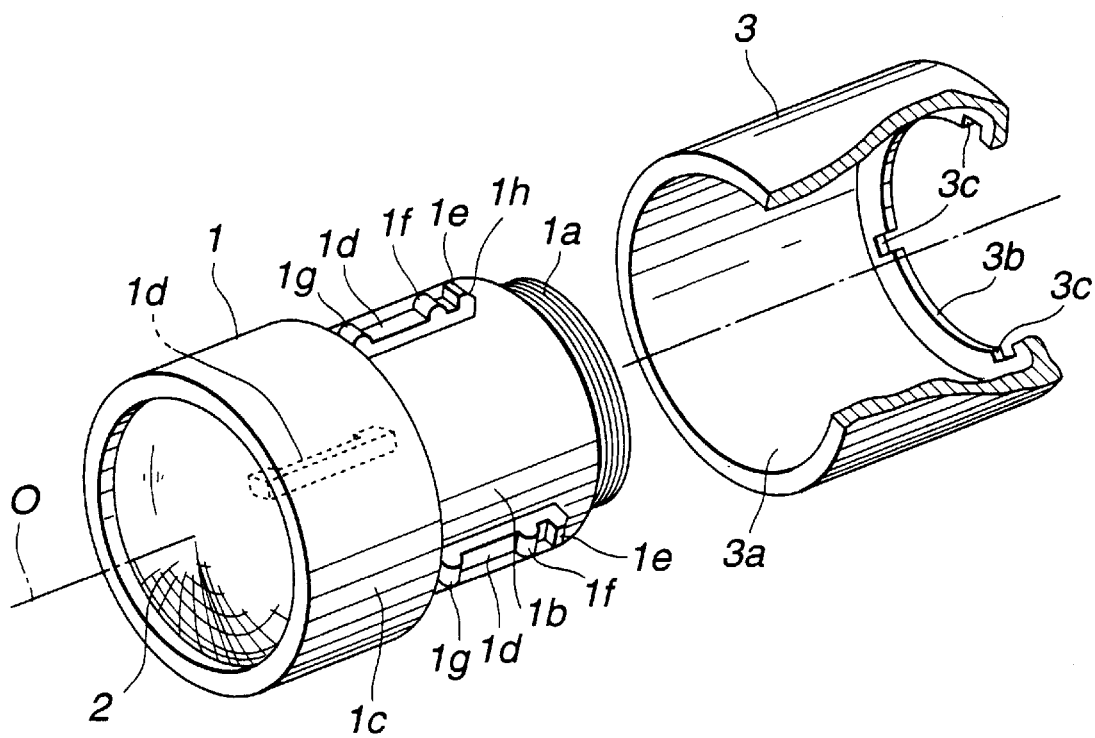
FIG. 1 is an exploded perspective view of a lens barrel assembly having a lens hood in accordance with one embodiment of the present invention.

Referring to the drawings, the embodiments of the present invention are now discussed.

Figure 2:
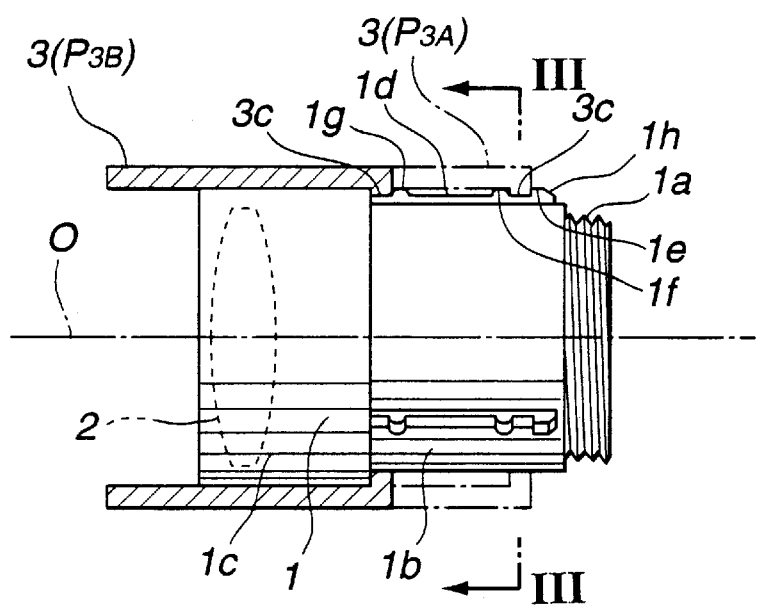
FIG. 2 is a cross-sectional view of the lens barrel assembly having the lens hood of the embodiment of FIG. 1.
Figure 3:
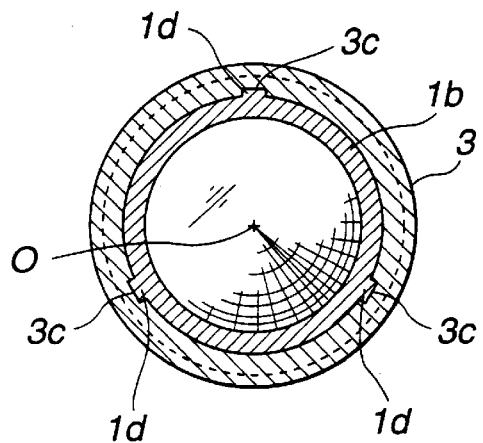
FIG. 3 is a cross-sectional view of the lens barrel assembly, taken along line III—III in FIG. 2.

FIG. 1 is an exploded perspective view showing a lens barrel assembly having a lens hood of one embodiment of the present invention. FIG. 2 is a sectional view of the lens barrel assembly having the lens hood in an assembled state. FIG. 3 is a cross-sectional view of the lens barrel assembly, taken along line III—III in FIG. 2.

The lens barrel assembly having the lens hood of this embodiment includes a lens barrel 1 and a lens hood 3. The lens barrel 1, fitted with an imaging lens 2, includes a mounting threaded portion 1a to be attached directly to a camera body or to be attached to a camera side lens frame, a first outer circumference portion 1b, and a second outer circumference portion 1c. The first outer circumference portion 1b is provided with three projected guide rails 1d running in a direction corresponding to the axis, at three circularly equally spaced positions around its circumference. The guide rail 1d includes, as locking means, a forward latch 1g distal to the camera body, a rearward latch 1f proximate to the camera body, and a rearward stopper projection 1e. The first outer circumference portion 1b and the second outer circumference portion 1c may share the same circumference. But in such a case, a forward stopper projection is required.

Each of the latches 1g and 1f is a semi-cylindrical projection perpendicular to the length of the guide rail 1d. A notch 3c of the lens hood 3 is latched at the position of each latch. However, the notch 3c is relatively easily run over the latches 1g and 1f, thus can be moved and then latched again.

The lens hood 3, constructed of an elastically deformable synthetic resin or rubber member, includes an inner circumference portion 3a in sliding engagement with the second outer circumference portion 1c of the lens barrel 1. A ring portion 3b is received around the first circumference portion 1b of the lens barrel 1. The ring portion 3b includes groove notches 3c which are in sliding engagement with the guide rails 1d.

When the lens hood 3 is attached to the lens barrel 1, the inner circumference portion 3a of the lens hood 3 is received around the lens barrel 1 from the threaded portion 1a side. The ring portion 3b is deformed until the notches 3c engage with the guide rails 1d (see FIG. 3). The rearward stopper projection 1e has a ramp 1h which helps the notch 3c easily run over the rearward stopper projection 1e when the lens hood 3 is attached to the lens barrel 1.

Figure 4:
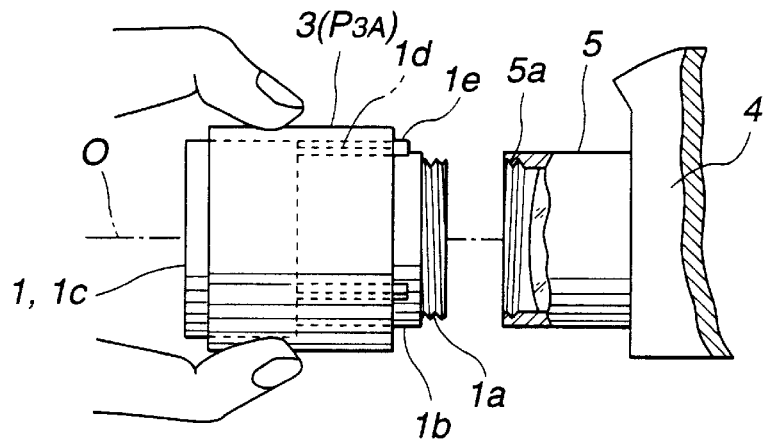
FIG. 4 is a side elevational view of the lens barrel assembly having the lens hood of the embodiment of FIG. 1 mounted to a camera side lens frame.

In the assembly drawing of the lens hood in FIG. 4, the threaded portion 1a of the lens barrel 1 is threadingly engaged with a threaded portion 5a of a lens frame 5 of a camera body 4 to mount the lens barrel 1 to the camera body.

To shift the lens hood 3 from a retracted position P3A into an operative state, the lens hood 3 is disengaged from the latch If by manually sliding the lens hood 3 over the lens barrel 1 in the direction corresponding to the optical axis.

The lens hoods is further slid along the guide rails 1d until the lens hood 3 abuts the latch 1g, thereby defining an operative position P3B (see FIG. 2), namely, a photographing position. When the lens hood 3 is at the operative position P3B, light rays other then the effective light rays are blocked during photographing.

To place the lens hood 3 into a retracted or inoperative state, the lens hood 3 is manually slid in the direction corresponding to the optical axis to deform the lens hood 3 and to disengage the notches 3c from the forward latches 1g. The lens hood 3 is slid toward the camera body until the notches 3c are engaged with the latches 1f at the retracted position P3A (see FIG. 2).

In the lens barrel assembly having the foregoing lens hood, the lens hood 3 is prevented from rotating relative to the lens barrel 1 with the notches 3c engaged with the guide rails 1d of the lens barrel 1. To mount the lens barrel 1 having the lens hood into the camera side lens frame 5, the lens hood 3, at the retracted position P3A as shown in the assembly drawing of the camera in FIG. 4, is manually rotated while holding the outer circumference of the lens hood 3. The lens hood 3 will not slip around the lens barrel 1. The lens barrel 1 with the lens hoods mounted thereon is thus successfully attached to or detached from the camera side lens frame 5. When the lens hood 3 is in an midway position between the operative position P38 and the retracted position P3A, the lens hood 3 is also prevented from slipping around the lens barrel 1. The lens barrel 1 is similarly smoothly attached to and detached from the camera body.

The lens hood 3 is moved back and forth between the retracted position P3A and the operative position P3B. The lens hood 3 is respectively locked in another position with the notches 3c reliably engaged with the latches 1f and 1g.

Figure 5:
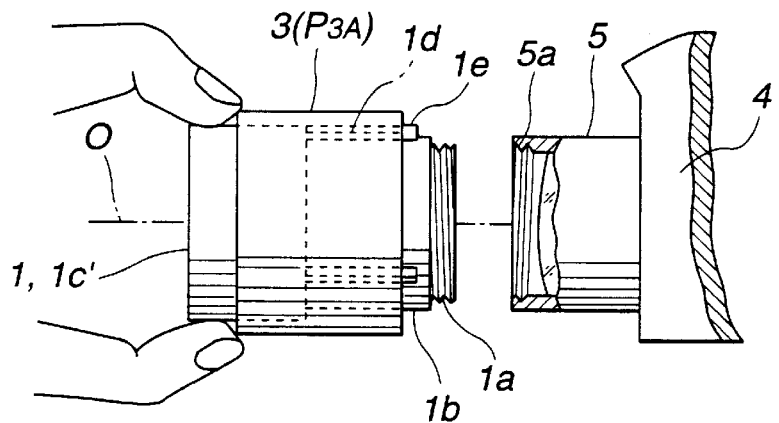
FIG. 5 is a side elevational view of one modification of the lens barrel assembly having the lens hood of the embodiment of FIG. 1 mounted to the camera side lens barrel.

When the lens hood 3 is in the retracted position P3A, as shown in an assembly drawing of the camera shown in FIG. 5, the forward circumference end portion 1c', near an object of the lens barrel 1 may be left exposed to a length that allows a user to grasp the lens barrel 1. The user may attach the lens barrel 1 to the camera side by holding and turning the exposed portion. The arrangement promotes the ease of use of the camera.

Figure 6:
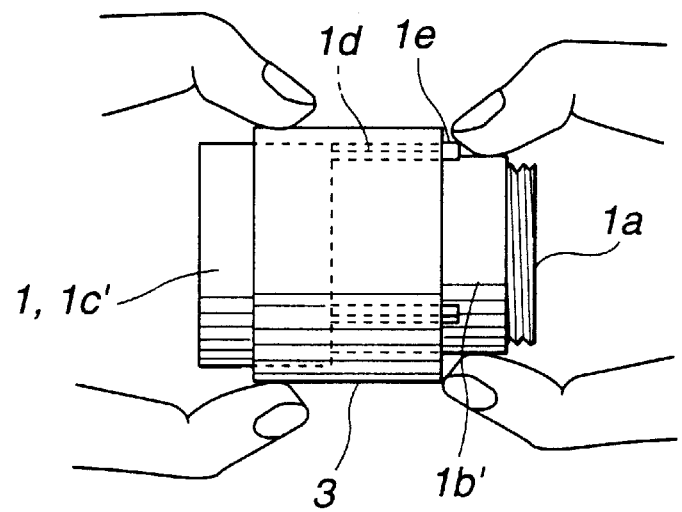
FIG. 6 is a side elevational view of another modification of the lens barrel assembly having the lens hood of the embodiment of FIG. 1 mounted to the camera side lens barrel.
Figure 7:
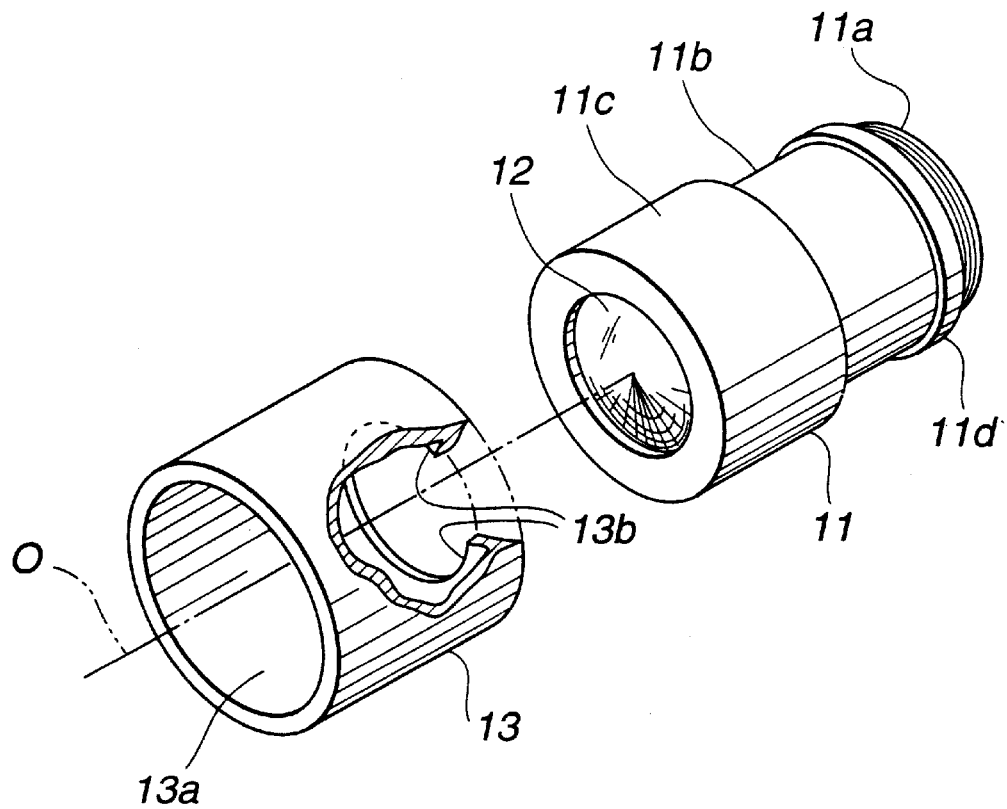
FIG. 7 is an exploded perspective view of a lens barrel assembly having a first conventional lens hood.
Figure 8:
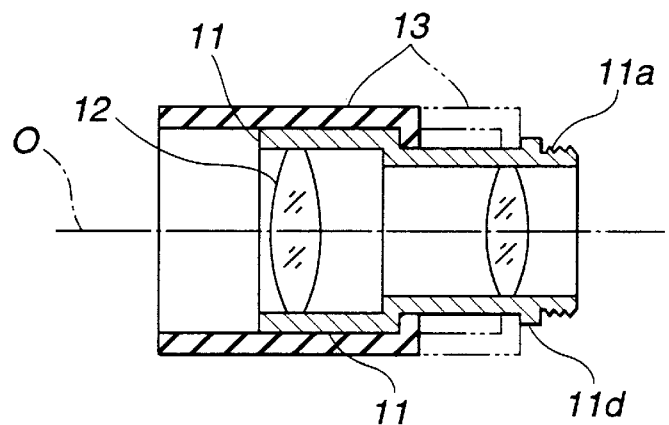
FIG. 8 is a cross-sectional view of the lens barrel assembly having the first conventional lens hood of FIG. 7.
Figure 9:
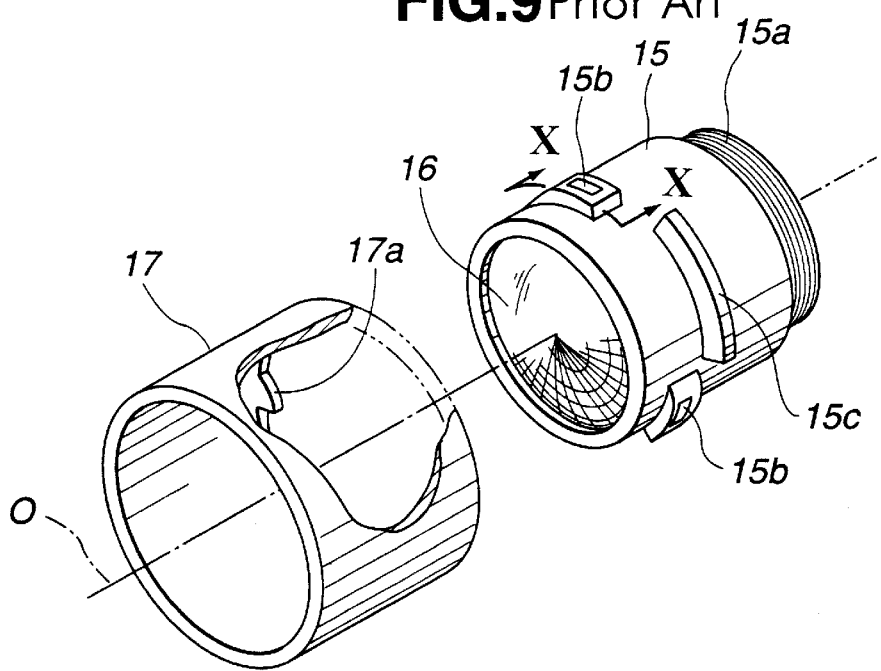
FIG. 9 is an exploded perspective view of a lens barrel assembly having a second conventional lens hood.
Figure 10:
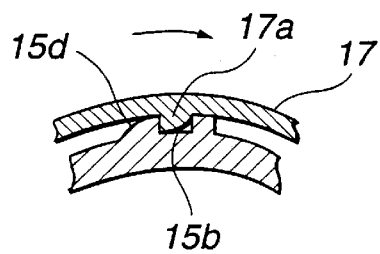
FIG. 10 is a cross-sectional view of the lens barrel assembly, taken along line X—X in FIG. 9.
Figure 11:
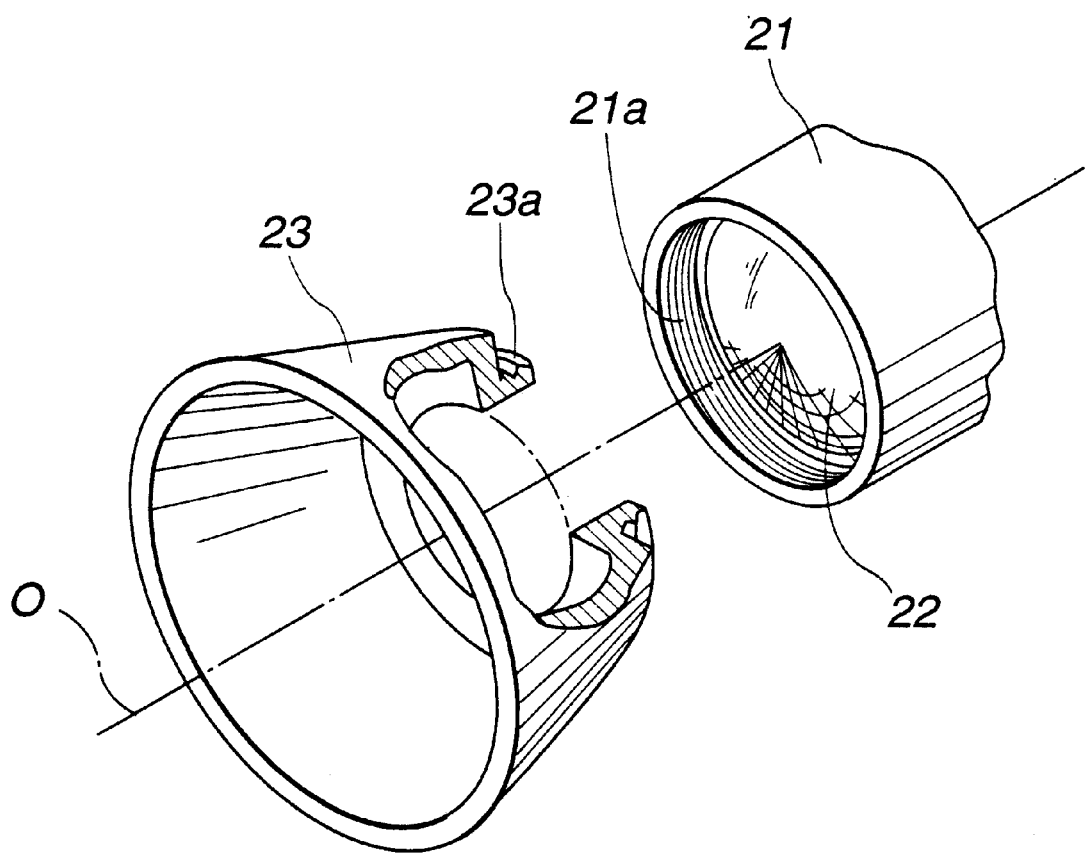
FIG. 11 is an exploded perspective view of a lens barrel assembly having a third conventional lens hood.

When the lens hood 3 is in the retracted position P3A, as shown in an assembly drawing of the lens barrel with the lens hood mounted thereon shown in FIG. 6, the rearward circumference end portion 1b', near the threaded portion, may be left exposed to a length that allows the user to grasp the lens barrel 1. By holding the exposed portion, the user may disengage the lens hood 3 from the lens barrel 1 with the notches disengaged from the latches or may move the lens hood 3 back and forth between the retracted position P3A and the operative position P3B. This arrangement promotes the ease of use of the camera.

In the lens barrel assembly having the lens hood of this embodiment, the lens barrel 1 may be replaced with an optical device for filtering or an adaptor having an optical element for wide angle and macro photographing. The threaded portion 1a may be replaced with a bayonet-style lens mount.

In the lens barrel having the lens hood of the present invention, the lens hood is easily positioned in the retracted position or the photographing position. The lens barrel is rotated by rotating the lens hood, and is therefore easily attached to and detached from the camera side. With the lens hood at the retracted state, the user can easily attach the lens barrel to the camera side by holding the forward circumference end portion of lens barrel. The user can also easily shift the lens hood to the retracted position or to the photographing position. This arrangement assures the ease of use of the camera.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A lens barrel assembly which is rotated to be detachably mounted to one of a camera body and an imaging lens frame for use in combination with said one of said camera body and said imaging lens frame, said lens barrel assembly comprising:

a lens barrel; and a lens hood, mounted on said lens barrel, movable between a photographing position, where said lens hood blocks light rays other than effective light rays during photographing, and a retracted position, where said lens hood is in a retracted non-photographing state, wherein said lens hood is movable with respect to said lens barrel only in a direction of an optical axis thereof.

2. A lens barrel assembly according to claim 1, wherein, with said lens hood in said retracted position, the forward circumference end portion of said lens barrel is projected and exposed from said lens hood in the optical axis direction so that said exposed circumference end portion is manually graspable.

3. A lens barrel assembly according to claim 2, wherein, with said lens hood in said retracted position, the rearward circumference end portion of said lens barrel is exposed in the optical axis direction so that said exposed rearward circumference end portion is manually graspable.

4. A lens barrel assembly which is rotated to be detachably mounted to one of a camera body and an imaging lens frame for use in combination with said one of said camera body and said imaging lens frame, said lens barrel assembly comprising:

a lens barrel;

a lens hood, movably mounted on said lens barrel, movable between a photographing position, where said lens hood blocks light rays other than effective light rays during photographing, and a retracted position, where said lens hood is in a retracted non-photographing state; and guide means for guiding said lens hood so that said lens hood is movable with respect to said lens barrel only in a direction of an optical axis thereof.

5. A lens barrel assembly according to claim 4, wherein, with said lens hood in said retracted position, the forward circumference end portion of said lens barrel is projected and exposed from said lens hood in the optical axis direction so that said exposed circumference end portion is manually graspable.

6. A lens barrel assembly according to claim 5, wherein, with said lens hood in said retracted position, the rearward circumference end portion of said lens barrel is exposed in the optical axis direction so that said exposed rearward circumference end portion is picked by fingers.

7. A lens barrel assembly according to claim 4, wherein said guide means is mounted on said lens barrel and said lens hood.

8. A lens barrel assembly according to claim 4, wherein said guide means comprises one of a projection and a groove formed on said lens barrel and one of a groove and a projection formed on said lens hood, in sliding engagement with said one of said projection and said groove formed on said lens barrel.

9. A lens barrel assembly which is rotated to be detachably mounted to one of a camera body and an imaging lens frame for use in combination with said one of said camera body and said imaging lens frame, said lens barrel assembly comprising:

a lens barrel;

a lens hood, mounted on said lens barrel, and movable in the direction of an optical axis of said lens barrel between a photographing position where said lens hood blocks light rays other than effective light rays during photographing, and a retracted position where said lens hood is in a retracted non-photographing state; and guide means which moves said lens hood in the direction of the optical axis with respect to said lens barrel, while causing said lens hood to integrally rotate with said lens barrel when said lens hood is rotated in either direction of rotation.

10. A lens barrel assembly according to claim 9, wherein said guide means causes said lens hood to integrally rotate with said lens barrel at least at said photographing position and said retracted position, when said lens hood is rotated in either direction of rotation.

11. A lens barrel assembly according to claim 9, wherein said guide means causes said lens hood to integrally rotate with said lens barrel in an entire range extending from said photographing position to said retracted position, when said lens hood is rotated in either direction of rotation.

12. A lens barrel assembly according to claim 9, wherein said guide means comprises one of a projection and a groove formed on said lens barrel and one of a groove and a projection formed on said lens hood and in sliding engagement with said one of said projection and said groove formed on said lens barrel.

13. A lens barrel assembly according to claim 9, comprising locking means for locking said lens hood at said photographing position and at the retracted position, so as not to move in the direction of the optical axis.

14. A lens barrel assembly according to claim 9, comprising locking means, formed in one of a projection and a groove on said guide means and locking said lens hood at said photographing position and at said retracted position, so as not to move in the direction of the optical axis.

* * * * *